United States Patent [19]

Liautaud

[11] Patent Number: 5,001,777
[45] Date of Patent: Mar. 19, 1991

[54] POLICE RADAR DETECTOR

[76] Inventor: James P. Liautaud, 70 Bluff Rd., Cary, Ill. 60013

[21] Appl. No.: 406,873

[22] Filed: Sep. 12, 1989

Related U.S. Application Data

[63] Continuation of Ser. No. 126,251, Nov. 27, 1987, abandoned.

[51] Int. Cl.$^5$ .............................................. H04B 1/16
[52] U.S. Cl. .................................. 455/227; 455/345; 342/20
[58] Field of Search .................. 455/227–229, 455/345, 349; 342/20, 69, 70, 457, 465

[56] References Cited

U.S. PATENT DOCUMENTS

| | | | |
|---|---|---|---|
| 3,660,844 | 5/1972 | Potter | 342/20 |
| 4,182,990 | 1/1980 | Coffin et al. | 342/20 X |
| 4,633,521 | 12/1986 | Liautaud | 455/345 |
| 4,668,952 | 5/1987 | Imazeki et al. | 342/20 |
| 4,700,191 | 10/1987 | Manor | 455/227 X |
| 4,719,462 | 1/1988 | Hawkins | 342/20 |

OTHER PUBLICATIONS

Csere et al.; "Find the Hidden Radar Detector;" *Car and Driver;* Mar. 1985, pp. 63–69.

*Primary Examiner*—Douglas W. Olms
*Assistant Examiner*—Ralph Smith
*Attorney, Agent, or Firm*—Willian Brinks Olds Hofer Gilson & Lione

[57] ABSTRACT

A radar detector system and method. The system includes a front-facing antenna and receiver and a rear-facing antenna and receiver. The two receivers are electrically connected to a single control head that includes separate light and sound indicators for each of the front-facing and the rear-facing receivers. A tone generator is included in the module to identify audibly the front-facing receiver and the rear-facing receiver.

12 Claims, 1 Drawing Sheet

MOTOR VEHICLE

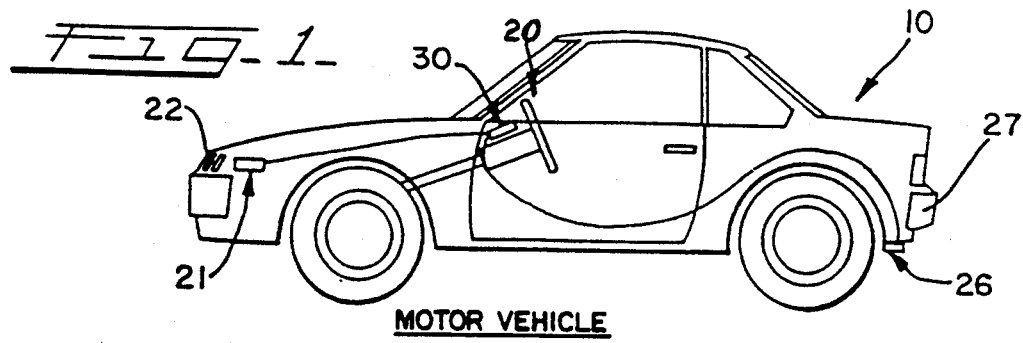
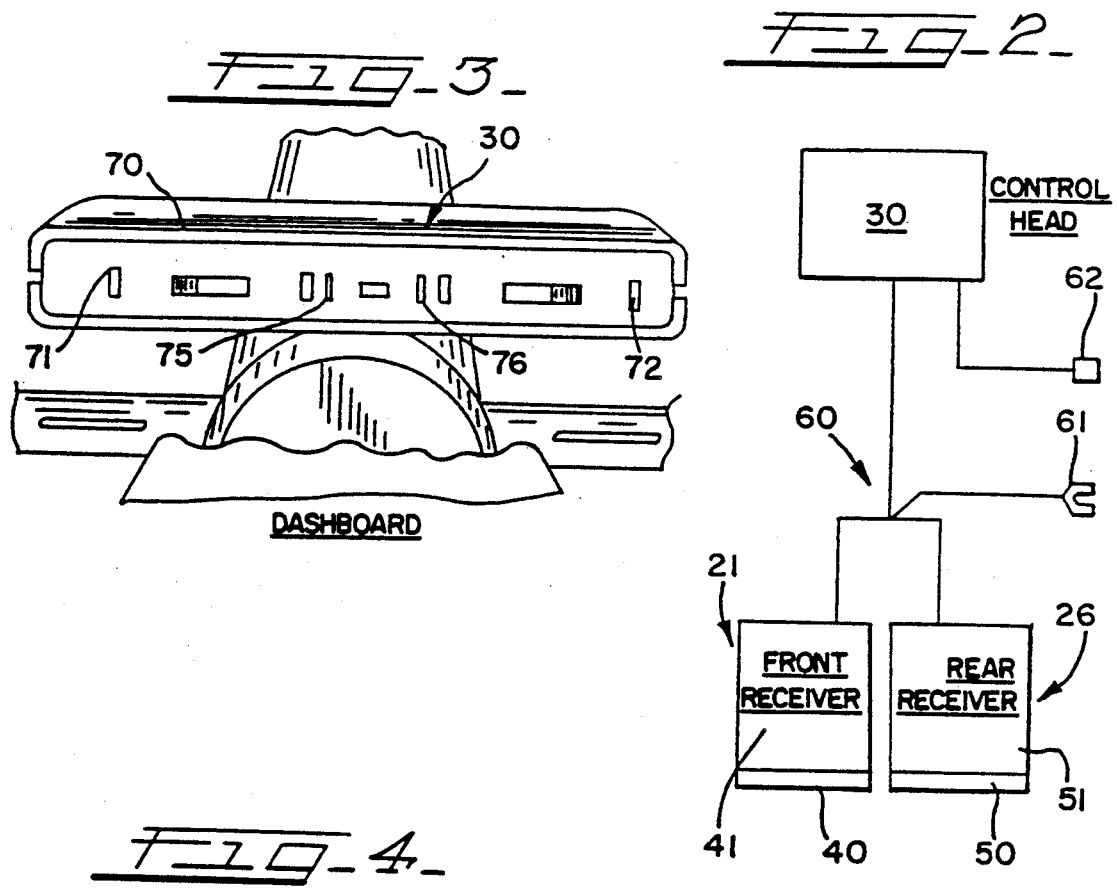
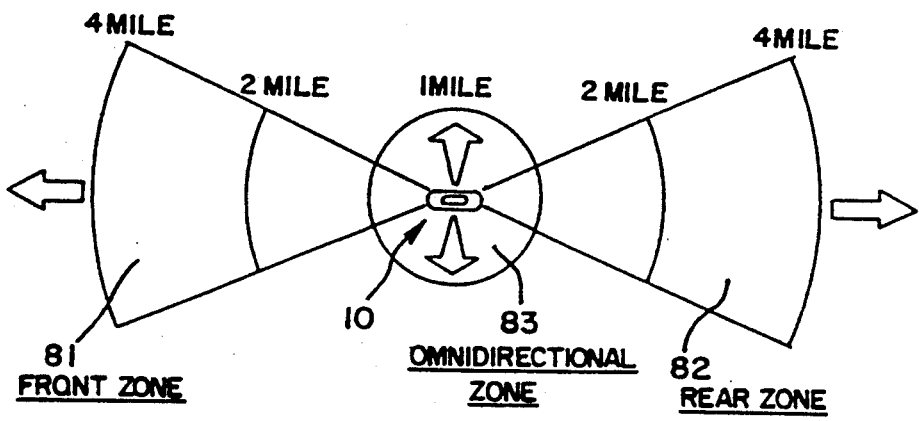

POLICE RADAR DETECTOR

This is a continuation of application Ser. No. 07/126,251, filed Nov. 27, 1987, now abandoned.

FIELD OF THE INVENTION

This invention is in the field of radar signal detection. It relates, more particularly, to a radar detector system and method for detecting police radar.

BACKGROUND OF THE INVENTION

It is conventional to utilize a radar detector in a motor vehicle to detect radar pulses emanating from police radar units so that the operator of the vehicle learns of the presence of a radar unit in the vicinity of the vehicle. A radar detector system conventionally comprises an antenna and a receiver component for picking up and converting the radar signal to an electrical signal and processing that signal, and a control/indicator component for controlling the system and indicating to the operator that a police radar unit is in the vicinity. The antenna and receiver component may be packaged with the control/indicator component in a single module mounted on the dashboard of a vehicle. In the alternative, the two components may be separated, with the antenna and receiver component located under the hood of the automobile, the antenna facing forward through the grille, for example, while the control/ indicator component is mounted on the dashboard or at some other location convenient to the operator of the vehicle.

Current systems detect the presence of police radar units in the vicinity of the vehicle, as has been pointed out. However, the position of the police radar unit is not indicated by any known systems. As a result, the operator of the vehicle may not know whether the radar unit is ahead of the vehicle, behind the vehicle, or even off to the side of the vehicle on a parallel road or down a side street.

SUMMARY OF THE INVENTION

An object of the present invention is to provide a police radar detector system which is capable of determining whether the radar source is behind the vehicle, in front of the vehicle, or off to the side of the vehicle.

Another object is to provide a police radar detector system wherein the vehicle operator can readily identify the position of the police radar on a single, conveniently located control head.

Still another object is to provide a radar detector system wherein the control head visually indicates the position of the radar.

Another object is to provide a new and improved method of detecting both the existence and position of police radar in relation to a moving vehicle, regardless of whether the police radar is located in front, back, or to the side of a vehicle.

The foregoing and other objects are realized in accord with the present invention by providing a radar detector system comprising a front-facing front antenna and receiver assembly, a rear-facing rear antenna and receiver assembly, and a single control head assembly electrically connecting them all. The head assembly is mounted adjacent the operator in the vehicle's driver compartment.

The front receiver is mounted in the front grille of the vehicle, with its antenna facing forward, unobstructed by anything metallic. The rear receiver is mounted under the rear bumper of the vehicle, with its antenna facing rearward, unobstructed by anything metallic.

Each receiver determines the band frequency and the amplitude of all superheterodyne signals which its antenna picks up. The receiver converts each signal to an electrical signal which is fed to a microprocessor in the receiver. Each microprocessor scans the signal sixteen times a second, measuring it for intensity (height) and frequency (width). Those measurements are stored in the random access memory of the microprocessor. If the processor memory records an identical signal on each of six successive scans, the presence of a police radar unit is signalled by that receiver to the control/indicator head. The control/indicator head then emits a visual (light) signal and an audio (beep) signal indicative of the strength of the radar signal picked up.

Each of the front and rear receivers continuously transmits information to the single head assembly. Respective light indicators glow more or less brightly depending upon radar signal strength. At the same time an audio signal is given more or less loudly, depending upon radar signal strength.

If a police radar is detected some distance in front of the car, for example, the front alarm light and audio will be activated at a relatively high intensity while the rear unit will not be activated at all, or be activated at a low intensity. The same will be true in reverse, if the police radar signal is detected from some distance in the rear of the vehicle. It has been found that the radar detection capabilities of this system operate up to four miles in front of the vehicle and four miles to the rear of the vehicle. As the police radar unit moves closer to the vehicle, the front and rear unit alarm intensities will become more alike.

If the police radar signal is detected at the side of a vehicle, both alarms will be activated at substantially equal intensities. The intensity of the warnings will change as the police radar signal moves, on the side of the vehicle, from front to back or from back to front. The system is capable of detecting police radar units up to one mile to the sides of the vehicle.

BRIEF DESCRIPTION OF THE DRAWINGS

The invention, including its construction and method of operation /are illustrated more or less diagrammatically in the drawings, in which:

FIG. 1 is a diagrammatic side elevational view of a motor vehicle incorporating the radar detection system embodying features of the present invention;

FIG. 2 is a schematic view of the radar detection system embodying features of the present invention;

FIG. 3 is a front elevational view of the indicator panel on the control/indicator head component; and FIG. 4 is a diagrammatic plan view of a vehicle utilizing the radar detector system embodying features of the invention, in relation to the radar search zones to the front and rear of the vehicle, and zones to each side of the vehicle.

DESCRIPTION OF THE PREFERRED EMBODIMENT

Referring to the drawing, and particularly to FIG. 1, a high performance motor vehicle is illustrated diagrammatically at 10. The motor vehicle 10 is equipped with a radar detector system 20 embodying features of the present invention.

The radar detector system 20 comprises a front radar signal receiver and antenna 21 located in front of the vehicle 10, facing forward through an opening in the grille 22, and a rear radar signal receiver and antenna 26 located under the rear bumper 27 of the vehicle 10 and facing rearward from under the bumper. The radar detector system 20 also includes a control/ indicator head 30 in the driver s compartment 31 of the vehicle 10, prominently displayed to the driver.

Referring now to FIG. 2, the front antenna and receiver 21 for the radar detection system 20 includes an antenna section 40 and a receiver section 41. The antenna section 40 faces forwardly through the grille 22 of the vehicle 10, with no metal obstruction in front of it.

The antenna section 40 picks up superheterodyne signals generated by radar detectors positioned up to four miles directly ahead of the vehicle 10. In addition, the antenna section 40 is effective to pick up police radar signals generated within about a mile in any other direction from the vehicle 10.

The receiver section 41 converts each radar signal received to an electrical signal which is fed through an ADC converter to a microprocessor in the receiver. The microprocessor scans the signal sixteen times a second, measuring it for intensity (height) and frequency (width). These measurements are stored in the random access memory of the microprocessor.

If the processor memory records an identical signal on each of six successive scans, the presence of a police radar unit is signaled by the receiver section 41 to the control/indicator head 30. In a manner hereinafter discussed, the head 30 then emits a visual (light) signal and an audio (beep) signal having a specific tone indicative of the radar signal picked up by the antenna section 40 and processed by the receiver section 41.

Still referring to FIG. 2, the rear antenna and receiver 26 for the radar detection system 20 includes an antenna section 50 and a receiver section 51. The antenna section 50 faces rearwardly of the vehicle 10, underneath the bumper 27.

The antenna section 50 operates in a manner identical to the antenna section 40 of the front antenna and receiver 20. If its processor memory records an identical signal in each of six successive scans, the presence of a radar unit is signalled by the receiver section 51 to the head 30. The head 30 then emits a visual (light) signal and an audio (beep) signal having a different specific tone, this one indicative of the radar signal picked up by the antenna and receiver 26.

Each of the receiver sections 41 and 51 is electrically connected by a simple, conventional circuit 60 to each other, to the head 30, and to a ground 61, in the manner illustrated in FIG. 2. The head 30 receives electrical power from a connection 62 with the 12 volt power system of the vehicle 10. This power is supplied to the receiver sections 41 and 51 from the control/indicator head 30 through the circuit 60.

Referring now to FIG. 3, the head 30 of the system 20 has its control panel 70 facing the driver of the vehicle, mounted on the steering wheel column, for example. Viewing the control panel 70, the vehicle operator sees the front detector alarm light 71 at the far left and the rear detector alarm light 72 at the far right of the panel. In addition to suitable circuitry for the two lights 71 and 72 in the head 30, the head also contains two conventional tone generators capable of generating two specific tones, one wired to the receiver section 41 and the other to the receiver section 51 throuth the circuit 60. Audio alarm speakers 75 and 76 are wired to the tone generators in the receiver sections 41 and 51, respectively.

Referring now to FIG. 4, the system 20 operates to provide three safety zones for the vehicle 10 and its driver. The front zone 81 is pie-shaped and extends approximately four miles in front of the vehicle 10. The rear zone 82 is also pie-shaped and extends approximately four miles to the rear of the vehicle 10. An omnidirectional zone 83 extends at least about one mile in any direction to the sides of the vehicle 10.

The front receiver and antenna 21 is, in itself, a commercially available component, sold by American Antenna Corp., Elgin, Illinois, as part of its K-40 Remote Radar unit. It is manufactured by the Beltronics Corporation of Toronto, Canada. The rear receiver and antenna 26 is identical. It is in the combination of these two components with the single control/indicator head 30, the latter incorporating separate light indicators 71 and 72, and separate tone generators, that the present invention is embodied.

The operating method for the system 20 is as follows. The system 20 is turned on when the vehicle 10 ignition is turned on. As the vehicle 10 proceeds down a highway the front receiver 21 searches four miles ahead while the rear receiver searches four miles behind. At the same time, they cooperate to search around the compass, to the sides of the vehicle, for about one mile.

If an X-band or K-band radar unit is detected more than about a mile in front of the vehicle 10 in zone 81 the light indicator 71 flashes while the indicator 72 does not, and a tone indicative of detection in front is beeped while no tone indicative of detection to the rear is heard. The light indicator 72 flashes and a tone indicative of detection to the rear is beeped if a radar unit is detected behind the vehicle 10 in zone 82.

When a radar unit anywhere on the side of the vehicle 10, within one mile, both sets of signals light. Similarly, both tones are beeped through the speaker 75. The receivers 21 and 26 cooperate to produce this sensitivity at any point to the side of the vehicle, i.e., within one mile. Independently, receivers of this type will provide rear quadrant and direct rear warning only up to a distance of about one-half mile or less, i.e., the sensitivity of the individual front receiver 21, for example, decreases rapidly and progressively as the radar unit moves from the front to the side to the rear of the vehicle.

While the preferred embodiment of the invention has been disclosed, it is understood that the invention is not limited to the disclosed example. Modifications in addition to those discussed can be made without departing from the invention. The scope of the invention is indicated in the appended claims, and all changes that come within the meaning and range of equivalency of the claims are therefore intended to be embraced therein.

I claim:

1. A radar detector system for use in a motor vehicle, comprising:
   a first receiver having a first directional antenna for detecting radar signals originating from in front of a motor vehicle, and to a lesser extent, from the sides of the motor vehicle;
   means for mounting the first receiver to a motor vehicle such that the first directional antenna detects radar signals originating from inn front of the vehicle in an unobstructed path;
   first sound means electronically connected to the first receiver for emitting an audible noise of a first pitch when the first directional antenna detects a radar signal;

a second receiver having a second directional antenna for detecting radar signals originating from behind a motor vehicle and, to a lesser extent, from the sides of the motor vehicle;

means for mounting the second receiver to a motor vehicle such that the second directional antenna detects radar signals originating from behind the vehicle in an unobstructed path;

second sound means electronically connected to the second receiver for emitting an audible noise of a second pitch when the second directional antenna detects a radar signal;

an indicator head which comprises the first sound means and the second sound means; and means for mounting the indicator head inside of a motor vehicle.

2. The radar detector system of claim 1 wherein the first receiver further comprises:

first conversion means connected to the first directional antenna for converting radar signals to electrical signals; and a first microprocessor electronically connected to the first conversion means, the first microprocessor comprising first scanning means for scanning the electrical signals, first measuring means for measuring the intensity and frequency of the electrical signals, a first random access memory for recording measurements generated by the first measuring means, and first signal means electronically connected to the first sound means for signaling the first sound means when the first random access memory records substantially identical measurements on each of six successive scans.

3. The radar detector system of claim 2 wherein the strength of the signal transmitted from the first signalling means to the first sound means varies according to the intensity and frequency of the electrical signals measured by the first measuring means, thereby causing the audible noise generated by the first sound means to be louder or softer depending upon the strength of the radar signals detected by the first directional antenna.

4. The radar detector system of claim 1 wherein the second receiver further comprises:

second conversion means connected to the second directional antenna for converting radar signals to electrical signals; and a second microprocessor electronically connected to the second conversion means, the second microprocessor comprising second scanning means for scanning the electrical signals, second measuring means for measuring the intensity and frequency of the electrical signals, a second random access memory for recording measurements generated by the second measuring means, and second signal means electronically connected to the second sound means for signaling the second sound means when the second random access memory records substantially identical measurements on each of six successive scans.

5. The radar detector system of claim 4 wherein the strength of the signal transmitted from the second signalling means to the second sound means varies according to the intensity and frequency of the electrical signals measured by the second measuring means, thereby causing the audible noise generated by the second sound means to be louder or softer depending upon the strength of the radar signals detected by the second directional antenna.

6. The radar detector system of claim 1 wherein the indicator head further comprises:

a first light thereon electronically connected to the first receiver such that the first light is on when the first directional antenna detects a radar signal, and is otherwise off; and a second light thereon electronically connected to the second receiver such that the second light is on when the second directional antenna detects a radar signal, and is otherwise off.

7. The radar detector system of claim 6 wherein the first receiver further comprises:

first conversion means connected to the first directional antenna for converting radar signals to electrical signals; and a first microprocessor electronically connected to the first conversion means, the first microprocessor comprising first scanning means for scanning the electrical signals, first measuring means for measuring the intensity and frequency of the electrical signals, a first random access memory for recording measurements generated by the first measuring means, the first signal means electronically connected to the first light for signaling the first light when the first light records substantially identical measurements on each of six successive scans.

8. The radar detector system of claim 7 wherein the strength of the signal transmitted from the first signaling means to the first light varies according to the intensity and frequency of the electrical signals measured by the first measuring means, thereby causing the first light to glow more or less brightly depending upon the strength of the radar signals detected by the first directional antenna.

9. The radar detector system of claim 6 wherein the second receiver further comprises:

second conversion means connected to the second directional antenna for converting radar signals to electrical signals; and a second microprocessor electronically connected to the second conversion means, the second microprocessor comprising second scanning means for scanning the electrical signals, second measuring means for measuring the intensity and frequency of the electrical signals, a second random access memory for recording measurements generated by the second measuring means, and second signal means electronically connected to the second light for signaling the second light when the second random access memory records substantially identical measurements on each of six successive scans.

10. The radar detector system of claim 9 wherein the strength of the signal transmitted from the second signalling means to the second light varies according to the intensity and frequency of the electrical signals measured by the second measuring means, thereby causing the second light to glow more or less brightly depending upon the strength of the radar signals detected by the second directional antenna.

11. The radar detector system of claim 1 wherein the first directional antenna detects radar signals originating from distances of up to about four miles in front of a motor vehicle and about one mile on either side of the motor vehicle.

12. The radar detector system of claim 1 wherein the second directional antenna detects radar signals originating from distances of up to about four miles behind a motor vehicle and about one mile on either side of the motor vehicle.

* * * * *

UNITED STATES PATENT AND TRADEMARK OFFICE
CERTIFICATE OF CORRECTION

PATENT NO. : 5,001,777
DATED : March 19, 1991
INVENTOR(S) : James P. Liautaud It is certified that error appears in the above-identified patent and that said Letters Patent is hereby corrected as shown below:

In column 2, line 45, please delete "/" and substitute therefor --,--.

In column 3, line 6, please delete "driver s" and substitute therefor --driver's--.

In column 4, line 35, after "detected" please insert --more than about a mile--.

In claim 1, line 9, please delete "inn" and substitute therefor --in--.

Column 7:
In claim 7, line 13, after "means," please delete "the" and substitute therefor --and--.

Signed and Sealed this

Fifteenth Day of September, 1992

*Attest:*

DOUGLAS B. COMER

*Attesting Officer*     *Acting Commissioner of Patents and Trademarks*